United States Patent

Wolf et al.

[15] 3,653,936
[45] Apr. 4, 1972

[54] PIGMENT PREPARATIONS

[72] Inventors: Karlheinz Wolf, Cologne-Stammheim; Artur Haus, Leverkusen; Reinhold Hornle, Cologne-Flittard; Theodor Mager, Leverkusen, all of Germany

[73] Assignee: Farbenfabriken Bayer Aktiengesellschaft, Leverkusen, Germany

[22] Filed: Apr. 8, 1969

[21] Appl. No.: 814,463

[30] Foreign Application Priority Data

Apr. 17, 1968 Germany......................P 17 67 245.6

[52] U.S. Cl.....................106/288 Q, 106/308 F, 106/308 N, 106/308 Q, 106/309

[51] Int. Cl..................................................................C09c

[58] Field of Search...............106/308 F, 308 N, 309, 308 Q, 106/288 Q

[56] References Cited

UNITED STATES PATENTS

| | | | |
|---|---|---|---|
| 2,173,430 | 9/1939 | Vogel | 106/308 F |
| 2,296,066 | 9/1942 | Sloan | 106/308 N |
| 3,375,123 | 3/1968 | Krocker et al. | 106/308 F |

Primary Examiner—James E. Poer
Assistant Examiner—H. M. S. Sneed
Attorney—Plumley, Tyner & Sandt

[57] ABSTRACT

Pigments are treated by contacting them with a mixture of (a) a resinic acid, e.g., colophony, or a salt of a resinic acid; and (b) a primary or secondary amine having the formula:

$$R-NH-R_1$$

in which R is a five- to six-membered, optionally substituted cycloaliphatic radical; and $R_1$ is hydrogen, R, or an alkyl group optionally substituted by an $NH_2$ group and containint two- to four-carbon atoms, or by preparing the neutral or acidic aqueous pigment in the presence of the treating agents (a) and (b). The treated pigments exhibit advantages such as better gloss and covering power.

8 Claims, No Drawings

PIGMENT PREPARATIONS

It is known that pigment dyestuffs must be present in a finely divided form in organic media, especially in printing inks and lacquers, in order to achieve high tinctorial strength.

In many cases these pigment dyestuffs are initially obtained in a finely divided form already in the production of these dyestuffs from an aqueous solution. However, after suction-filtration and drying, they form very solid agglomerates which have again to be comminuted in aqueous or organic media before they are further processed, in order to achieve high tinctorial strength of the pigment preparations. This comminution requires a high expenditure in time and energy in the conventional grinding units, such as funnel and ball mills. Furthermore, it is not always possible to achieve a sufficient fineness of all pigment dyestuffs together with a high gloss and good flowing capacity.

It has already been disclosed that pigment dyestuffs of the azo series which have a soft grain are obtained when their production is carried out in the presence of paraffin oils in combination with interface-active substances as emulsifiers. Furthermore, from German Published Patent Specification No. 1,173,601 a process is known for the production of pigment dyestuffs of the azo series with a particularly high tinctorial strength, which consists in adding, during coupling, interface-active salts of primary fatty amines with carboxylic acids. Finally, in French Patent Specification No. 1,428,172 the production of readily dispersible pigments is described by the addition of long-chain aliphatic amines to the pigment moistened with water and subsequent drying, possibly also adding to the mixture metal salts of resinic acids, for example, colophony.

Pigment formations of this type can either not be sufficiently readily dispersed in organic media or they do not afford any advantages in book and offset printing inks with regard to gloss and flowing property in comparison with untreated pigments. Furthermore, organic pigments have already been treated, during or after their production, in the presence or absence of tensides, with the alkaline solution of a resinic acid (a so-called hydrolized resin), and the resin has subsequently again been precipitated with the aid of metal salts, such as titanium, aluminium, nickel, cerium, chromium, beryllium and zinc salts, together with the pigments (cf. Belgium Patent Specification No. 587,374 and U.S. Patent Specification No. 2,772,983). Even with pigments treated according to this process, no printing inks can be produced which have a good gloss as well as a good flowing capacity.

It has now been found that pigment preparations can be produced which can be more easily dispersed in organic media, especially in drying oils and oil varnishes, than the corresponding untreated pigments or those pigments treated according to the above-mentioned processes, and with which it is possible to produce printing inks, especially book and offset printing inks, which have a strong tinctorial strength, gloss and good flowing capacity, by adding to the neutral or acidic aqueous pigment dispersion or, in the case of pigment dyes of the azo series, to the coupling mixture a. resinic acids or salts or resinic acids, and
b. primary or secondary cycloaliphatic amines of the general formula $$R-NH-R_1 \qquad (I)$$

in which R stands for a five- or six-membered, optionally substituted cycloaliphatic radical, and $R_1$ stands for hydrogen, for R or for an alkyl group which may be substituted by a $NH_2$ group and contains two to four carbon atoms, optionally rendering the mixture alkaline, optionally followed by heating it, preferably to temperatures of 50°–100° C. and subsequently acidifying this mixture with acids if it has an alkaline or neutral reaction, and then isolating the pigment preparation in conventional manner by suction-filtration and optionally by washing with water and drying.

Mixtures of various amines of the formula (I) can obviously also be used for this purpose.

The sequence of adding the amines and resins is of no importance in this connection. The amines can be added as such, optionally in organic or aqueous solution or emulsion, but also in form of their salts, for example in the form of the ammonium salts of resinic acids.

The resinic acids may be added to the pigment dispersions as such or in the form of alkaline solutions in water or in water-miscible organic solvents, such as alcohols, glycols or glycol ethers, or in mixtures of these solvents with water. In a preferred embodiment the pigment dispersion is rendered alkaline, if it has no alkaline reaction, after the amine and resin addition, the alkaline mixture is subsequently heated for several hours, preferably for two to four hours, at an elevated temperature, preferably at about 80°–90° C, or kept at room temperature for a prolonged period of time, for example, for 10–15 hours, and then acidified; the pigment is isolated in customary manner by suction-filtration, washing and drying.

Pigment dyestuffs suitable for the process according to the invention are the following: organic pigments, e.g., pigment dyestuffs of the azo series, colour lakes (laked dyes) [cf. Ullmanns Encyklopaedie der technischen Chemie, vol. 13, pages 806 and 808 (1962)], complex pigment dyestuffs (cf. Ullmanns Encyklopaedie d. techn. Chem., vol. 13, page 809) anthraquinone dyestuffs (cf. Ullmanns Encyclopaedie d. techn. Chem., vol. 3, page 696 [1953]), phthalocyanine pigment dyestuffs and quinacridone pigments as well as inorganic pigments, e.g., titanium dioxide, iron, cadmium, chromium and zinc pigment and carbon black.

Suitable amines of the general formula (I) are the following, for example: cyclohexylamine, hexahydroamino-toluene, N-cyclohexyl-propylene-diamine(1,3), dicyclohexylamine, and the diamine of the formula

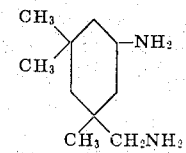

Suitable salts are particularly those of strong inorganic acids, such as HCl HBr, $H_2SO_4$, $H_3PO_4$, as well as of organic acids, such as carboxylic acids or sulphonic acids.

The amines or their salts are used for this purpose in quantities of about 1–100 percent by weight, preferably 3–15 percent by weight, referred to the pigment dyestuff used.

Suitable resinic acids are all natural or synthetic types of resins which contain in the molecule one or more acid groups, e.g., colophony or resins containing a substantial colophony proportion, hydrogenated or dimerised colophony resins, hydrolisable oil-free alkyd resins, furthermore hydrolisable maleinate resins, colophony-modified phenol resins and shellac (see Karsten, Lackrohstofftabellen, 4th edition [1967], publisher Curt R. Vincentz, Hanover). The resinic acids are used for this purpose in quantities of about 1–100 percent by weight, preferably 5–30 percent by weight, referred to the pigment dyestuff.

The alkaline pigment/amine/resinic acid mixtures can be acidified with organic as well as with inorganic acids. Lower aliphatic carboxylic acids, such as acetic acid, are preferably used for this purpose.

Customary auxiliaries may also be used for the pigment production, e.g., anionic, cationic, or non-ionic tensides in aqueous solution or dispersion, or in organic solvents. The following may be mentioned by way of example: long-chain alkyl and alkylaryl sulphonates, pyridinium salts, tensides based on ethylene oxide and propylene oxide, and carboxylic acid esters of polyglycols.

The pigment preparations obtainable according to the invention are advantageously produced in such a way that the neutral aqueous dispersion of the pigment dyestuff is mixed, optionally while stirring, with the free amines and the aqueous-alkaline resinic acid solution; in the case where the mixture has no alkaline reaction, it is rendered alkaline, optionally heated for some time while stirring, subsequently acidified and the pigment is then isolated in known manner by suction-filtration and optionally by washing with water and drying.

In some cases it is advantageous to grind the aqueous pigment dispersion on a wet grinding device before or after adding the amines and resins.

In the production of pigment preparations from pigment dyestuff of the azo series, the amines and the alkaline resinic acid solution may already be added to the diazo or coupling components before or during coupling but advantageously to the alkaline solution of the coupling component in the case of an alkaline coupling. In the case of an acid coupling the alkaline solution of the coupling component is mixed with the alkaline resinic acid solution, precipitated with an acidic solution of the amine, followed by coupling. According to this method the coupling mixture is preferably rendered alkaline before isolating the pigment dyestuff and subsequently acidified.

The numbers of the dyestuffs relate to those given in Color Index, 2nd edition, vol. III.

EXAMPLE 1

Twenty-four g of a hydrolisable maleinate resin (acid number 210, melting point 110°–120° C) are dissolved at 60°–90 C in 60 ml water and 24 ml of a 40 percent by volume caustic soda solution, and 6 g N-cyclohexyl-propylene-diamine-1,3 are added. This solution is added, while stirring, to an aqueous pigment dispersion prepared from 490 g of the 24.5 percent filter cake of the yellow azo dyestuff No. 21,100 and 1000 ml of water. The mixture is heated at 80°–90° C for 4 hours and then slowly acidified with dilute acetic acid. The product is subsequently filtered off with suction, washed until neutral and dried at 40° C.

A book and offset printing ink produced in usual manner with the pigment preparation described above has a substantially higher gloss, better flowing capacity and greater brilliancy than a printing ink produced from an untreated pigment.

If, instead of the azo dyestuff No. 21,100, the pigments mentioned below are used and the alkaline pigment suspension is ground in a wet comminuting unit before acidification, then similar good results are achieved:
a. Cd S/Se pigments
b. the violet pigment dyestuff of the formula

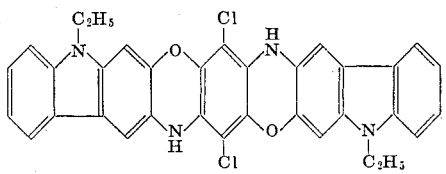

(c) the pigment dyestuff of the formula

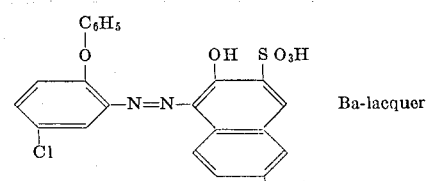

Ba-lacquer (d) the pigment dyestuff of the formula

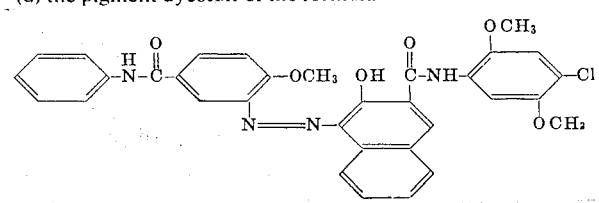

EXAMPLE 2

Three hundred twenty g 3'-dichloro-4,4'-diamino-diphenyl are stirred with about 2500 ml water and 525 ml hydrochloric acid (19.5° Be) and the mixture is diazotized at 0°–5° C with 613 ml of a 30 percent by volume sodium nitrite solution. 460 g acetoacetic acid anilide are dissolved at 30° C in 4500 ml water and 341 ml. of a 40° percent by volume caustic soda solution and mixed with a resin solution prepared at 60°–90° C from 80 g of a hydrolizable resin (acid number 210; melting point 110°–120° C; colophony-modified maleinate resin), 80 ml of a dilute caustic soda solution (40 percent by volume) and 200 ml water. After the addition of an aqueous solution of 440 g sodium benzoate, the acetoacetic anilide is again precipitated at a temperature of 5°–10° C with a solution consisting of 40 g N-cyclohexyl-propylene-diamine-(1,3), 415 ml glacial acetic acid and 500 ml water. To this mixture there is slowly added the solution of the diazotized 3,3'-dichloro-4,4'-diamino-diphenyl. When the coupling is completed, the mixture is heated to 80°–90° C and adjusted to pH 11 with about 1000 ml of a 40 percent by volume caustic soda solution. After heating at 80°–90° C for 5 hours, the mixture is slowly rendered acidic with acetic acid and subsequently filtered off with suction. The residue is washed with water and dried at 50° C.

A book and offset printing ink produced with this pigment preparation in customary manner is glossy, intense in color and has a good flowing capacity.

EXAMPLE 3

In accordance with Example 1, a pigment preparation is produced from the filter cake of the yellow disazo pigment of the formula

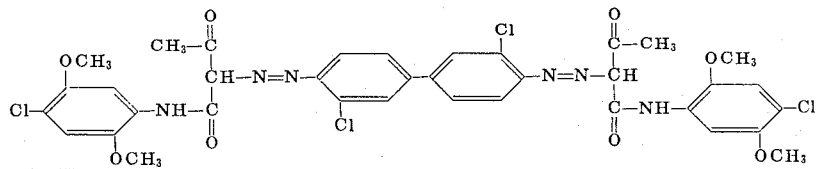

Instead of 6 g N-cyclohexyl-propylene-diamine-1,3, a mixture is used obtained from 3 g dicyclohexylamine and 3 g N-cyclohexyl-propylene-diamine-1,3.

Book and offset printing inks prepared in usual manner with this pigment preparation have a better gloss and a higher tinctorial strength than those produced with the untreated pigment.

The same results are achieved when the process is carried out as described in Example 1 but, instead of heating at 80°–90 C for 4 hours, the reaction mixture is stirred at room temperature for 12 hours.

EXAMPLE 4

An alkaline mixture of 100 g copper phthalocyanine blue (β-modified), 5 g N-cyclohexyl-propylene-diamine-1,3, 20 g of the sodium salt of a carboxyl group-containing maleinate resin and 1000 ml water is ground on a wet comminuting unit and heated at 80°–90° C for 2 hours as described in Example 1. The pigment dispersion is then acidified with dilute acetic acid, the product filtered off with suction and dried.

EXAMPLE 5

As described in Example 1, a solution is prepared from the hydrolizable maleinate resin, caustic soda solution and N-cyclohexyl-propylene-diamine-1,3. This alkaline solution is added dropwise, while stirring, to the aqueous pigment dispersion described in Example 1 and containing a sufficient amount of acid that the alkaline zone forming in each case at the entrance of the resin solution immediately disappears upon stirring. When the total resin addition is completed, an acidic pigment suspension is obtained which is filtered off with suction and further worked up as described in Example 1. The pigment preparation thus produced exhibits the same outstanding properties as that described in Example 1.

We claim:

1. A process for treating organic pigments comprising contacting an organic pigment dispersion with (a) a resinic acid containing one or more acid groups selected from the group consisting of colophony, hydrogenated colophony, dimerized colophony, hydrolizable oil-free alkyd resins, hydrolizable maleinate resins, colophony-modified maleinate resin, colophony-modified phenol resins and shellac, or an alkaline solution of said resinic acid in water, water-miscible organic solvents, or mixtures thereof; and (b) a primary or secondary cycloaliphatic amine having the formula $$R-NH-R_1$$

in which R is an unsubstituted five- or six-membered cycloaliphatic radical or a five- to six-membered cycloaliphatic radical substituted with methyl or $NH_2$-methyl; and $R_1$ is hydrogen, R, alkyl of two to four carbon atoms, or alkyl of two to four carbon atoms substituted by $-NH_2$.

2. The process of claim 1 wherein the mixture is made alkaline after the addition of the treating agents (a) and (b).

3. The process of claim 1 wherein the mixture is heated.

4. The process of claim 2 wherein the alkaline mixture is subsequently acidified and the pigment is isolated.

5. The process of claim 1 wherein said pigment is prepared in the presence of said treating agents (a) and (b).

6. The process of claim 1 wherein said amine is N-cyclohexyl-propylene-diamine-1,3.

7. The process of claim 1 wherein the amine comprises 1–100 percent by weight, and the resinic acid or salt comprises 1–100 percent by weight based on the pigment.

8. The treated pigment produced by the process of claim 1.

* * * * *